(12) United States Patent
Balakrishnan

(10) Patent No.: US 11,669,901 B2
(45) Date of Patent: Jun. 6, 2023

(54) COMMUNICATION NETWORK FOR GAMING REWARDS

(71) Applicant: CORE SCIENTIFIC, INC., Bellevue, WA (US)

(72) Inventor: Ganesh Balakrishnan, Sammamish, WA (US)

(73) Assignee: CORE SCIENTIFIC OPERATING COMPANY, Bellevue, WA (US)

(*) Notice: Subject to any disclaimer, the term of this patent is extended or adjusted under 35 U.S.C. 154(b) by 346 days.

(21) Appl. No.: 16/841,659

(22) Filed: Apr. 6, 2020

(65) Prior Publication Data
US 2021/0012420 A1    Jan. 14, 2021

Related U.S. Application Data

(60) Provisional application No. 62/873,759, filed on Jul. 12, 2019.

(51) Int. Cl.
*A63F 9/24* (2006.01)
*G06Q 40/04* (2012.01)
*G06Q 20/38* (2012.01)
*G06Q 50/06* (2012.01)
*G06Q 30/0207* (2023.01)
(Continued)

(52) U.S. Cl.
CPC ............. *G06Q 40/04* (2013.01); *A63F 13/35* (2014.09); *G01K 3/005* (2013.01); *G01K 13/00* (2013.01); *G06F 9/4881* (2013.01); *G06F 9/5094* (2013.01); *G06Q 10/06316* (2013.01); *G06Q 20/381* (2013.01); *G06Q 30/0209* (2013.01); *G06Q 50/06* (2013.01); *G06T 1/20* (2013.01); *H04L 67/02* (2013.01); *H04L 67/52* (2022.05)

(58) Field of Classification Search
CPC .. G07F 17/3225; G07F 17/3295; A63F 13/87; A63F 13/335; A63F 13/35; A63F 13/00; A63F 13/30; A63F 13/31
See application file for complete search history.

(56) References Cited

U.S. PATENT DOCUMENTS 7,516,360 B2   4/2009   Bacher
7,730,456 B2   6/2010   Okawa
(Continued)

OTHER PUBLICATIONS

Iyer, Kavita; Tesla Model S Owner Hacks His Vehicle to Mine Cryptocurrency for Free, Dec. 2017 https://www.techworm.net/2017/12/tesla-model-s-owner-hacks-vehicle-mine-cryptocurrency-free.html.
(Continued)

*Primary Examiner* — David L Lewis
*Assistant Examiner* — Eric M Thomas
(74) *Attorney, Agent, or Firm* — Fishman Stewart PLLC

(57) ABSTRACT

A communication network may include a first computer and a second computer configured for communication with each other. The second computer may include a project manager module configured to receive computing projects from the first computer and manage the execution of work tasks for the computing projects. The project manager may throttle performance if needed to prevent negative impact on the performance of other applications also being executed on the second computer, such as a video game. Rewards for performing the work tasks may be automatically converted from a first cryptocurrency to a second currency such as a video game currency.

20 Claims, 4 Drawing Sheets

(51) Int. Cl.
  *G06Q 10/0631* (2023.01)
  *G06F 9/48* (2006.01)
  *G06T 1/20* (2006.01)
  *G01K 3/00* (2006.01)
  *G01K 13/00* (2021.01)
  *A63F 13/35* (2014.01)
  *H04L 67/02* (2022.01)
  *G06F 9/50* (2006.01)
  *H04L 67/52* (2022.01)

(56) References Cited

U.S. PATENT DOCUMENTS

| | | | |
|---|---|---|---|
| 9,063,738 | B2 | 6/2015 | Jain |
| 9,201,686 | B2 | 12/2015 | Dey |
| 11,108,856 | B2 | 8/2021 | Li |
| 2007/0083778 | A1 | 4/2007 | Nagano |
| 2007/0204626 | A1 | 9/2007 | Pan |
| 2009/0135751 | A1 | 5/2009 | Hodges |
| 2010/0058087 | A1 | 3/2010 | Borras |
| 2010/0280676 | A1 | 11/2010 | Pabon |
| 2011/0145380 | A1 | 6/2011 | Glikson |
| 2012/0003932 | A1 | 1/2012 | Zhodzishsky |
| 2012/0142429 | A1* | 6/2012 | Muller .............. A63F 13/69 463/42 |
| 2012/0155347 | A1 | 6/2012 | Husted |
| 2012/0266002 | A1 | 10/2012 | Kim |
| 2013/0214600 | A1 | 8/2013 | Van De Poel |
| 2013/0276094 | A1 | 10/2013 | Prat |
| 2015/0106001 | A1 | 4/2015 | Lee et al. |
| 2016/0147292 | A1 | 5/2016 | Sunwoo |
| 2016/0378549 | A1* | 12/2016 | Irish ............. H04L 67/1001 718/107 |
| 2017/0361727 | A1 | 12/2017 | Miftakhov et al. |
| 2018/0039519 | A1 | 2/2018 | Kumar |
| 2018/0339601 | A1 | 11/2018 | Kruszelnicki |
| 2018/0369692 | A1* | 12/2018 | Winick ............. A63F 13/235 |
| 2019/0016419 | A1 | 1/2019 | Sheldon-Coulson |
| 2019/0042157 | A1 | 2/2019 | Bonen |
| 2019/0193569 | A1 | 6/2019 | Oh et al. |
| 2020/0234178 | A1 | 7/2020 | Florez Choque |
| 2020/0284599 | A1 | 9/2020 | Cyr et al. |
| 2021/0114472 | A1 | 4/2021 | Stephens |

OTHER PUBLICATIONS

Mitchell, Eddie; "Startup Launches Blockchain Powered Electric Vehicles That Mine Cryptocurrency" Sep. 2018 https://cointelegraph.com/news/startup-launches-blockchain-powered-electric-vehicles-that-mine-cryptocurrency.

Blenkinsop, Connor; "Port Allows You to Buy Altcoins Using Fiat, Without Converting to Bitcoin or Ethereum First" Jan. 2019 https://cointelegraph.com/news/portal-allows-you-to-buy-altcoins-using-fiat-without-converting-to-bitcoin-or-ethereum-first.

Buntnix, JP; "The Future of Crypto Mining May Involve Electric Vehicles" Sep. 2019 https://nulltx.com/the-future-of-crypto-mining-may-involve-electric-vehicles/.

Blewit, Richard Tyr; "Is Mining Cryptocurrency in the Boot of Your Electric Car a Good Idea? No" Dec. 2017 https://www.neowin.net/news/is-mining-cryptocurrency-in-the-boot-of-your-electric-car-a-good-idea-no.

"A clever Tesla owner is using his Model S to mine cryptocurrency for free," Nov. 30, 2017, <https://thenextweb.com/news/tesla-model-s-cryptocurrency-free>, accessed Apr. 20, 2022.

"Understanding Prag Pow," <https://medi um .com/@ifdefelse/understanding-progpow-performance-and-tuning-172713898db3>, Oct. 25, 2018, p. 1-12. (Year: 2018) V w X.

* cited by examiner

COMMUNICATION NETWORK FOR GAMING REWARDS

CROSS-REFERENCE TO RELATED APPLICATIONS

This application claims priority to U.S. Provisional Patent Application Ser. No. 62/873,759, filed on Jul. 12, 2019, and titled "COMMUNICATION NETWORK", the contents of which are hereby incorporated by reference in their entirety.

TECHNICAL FIELD

The present disclosure generally relates to communication networks, including communication networks that may be used in connection with blockchains, cryptocurrencies, and/or video games.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Gaming on PCs, consoles, mobile devices, and online have become increasingly popular. As a result of this increased interest, game titles have improved and evolved. To be successful, they now often require significant resources and effort to develop, including both large amounts of code and high-quality creative assets such as artwork, 3D animation, and audio. Due to the large investment in games and the large number of competing titles, monetizing games has become difficult. The traditional model of pay-to-play has been surpassed by newer monetization models including the in-app purchase (IAP) model and ad-sponsored model. Many IAP games are free for the user to play. Instead of charging a fee to play, they offer to sell users virtual in-game items (e.g., in-game coins, tokens, weapons, power ups, skins) or loot boxes. Loot boxes provide the user a chance to win one or more in-game items. Ad-sponsored games typically give users an option to either watch an ad or pay a fee to remove ads. Some ad-sponsored games even offer helpful in-game virtual items to users in exchange for watching ads. However, even with all these new monetization models, many users are still not monetized. Many users do not want to pay to play games, and repeatedly displaying ads can annoy users and drive them away. For this reason, a different system and method for monetizing gaming users is needed.

Some game developers run promotions by giving away paid in-game content for free, which may result in a significant lift in monetization of non-paying players and reactivation of lapsed players. Depending on the game and the quality of the content given away for free, some estimates suggest that game developers have seen a 10-40% lift in conversion of non-paying players into paying players and a 20-45% lift in reactivation of lapsed players after they claim and use the promotional content give away. While these promotions may provide a cost-effective way to acquire, retain, and monetize players, game developers may limit use of this tool because the method may marginalize the value of paid content (e.g., by incentivizing the behavior where players wait for content to be available for free instead of buying it). To mitigate this risk, game developers tend to use this tool only 1-2 times a quarter and resort to other more expensive mechanisms regularly.

Some prior systems attempting to address this gamer monetization problem have capitalized on the recent popularity in blockchain-based cryptocurrencies by installing a cryptocurrency-mining application on gamer's PCs. The application mines cryptocurrency using the PC's GPUs (graphics processing units) when the PC is not actively being used. These systems typically keep the cryptocurrency rewards that are generated and instead compensate the gamers through credits or tokens ("video game currency") that can be redeemed for in-game items, game downloads or credits, or chances to win physical prizes (e.g., game controllers or headphones).

These prior solutions have several drawbacks. They are typically configured to operate whenever the user's mouse is not moving, and then stop whenever the user's mouse is moving. When operating, they use significant electricity and create significant heat, causing the PC's fans to spin up, often to maximum speed creating unwanted noise.

For at least these reasons, there is a desire for solutions/options that minimize or eliminate one or more of these shortcomings. The foregoing discussion is intended only to illustrate examples of the present field and is not a disavowal of scope.

SUMMARY

The problems noted above at least in part are addressed by a system and method for operating a communications network in accordance with the present disclosure.

In one embodiment, a communication network configured to overcome at least some of the shortcomings noted above may comprise a first computer and one or more second computers that are configured for communication with the first computer. The second computers may each comprise a GPU and a project manager. The project manager may be configured to receive computing projects from the first computer and cause the GPU to work on the computing projects only when an estimated cost to perform the work is less than an estimated value of an expected reward for successfully completing the work. The expected reward may be determined based on a specified reward from a first cryptocurrency network and an exchange rate for the first cryptocurrency and a fiat currency. The project manager may be configured to receive computing projects from the first computer and control work performed by the second computer on the computing projects. The first computer and the second computer may be configured to convert the reward into a video game currency that may be usable for ad-free game playing or purchasing items (e.g., in-game or real-world items).

The project manager may be configured to calculate the cost to perform the work by multiplying (i) an estimate of the power required to perform the work on the second computer, and (ii) a power unit cost for the geographic location of the second computer as received from a third computer that may be configured to provide utility rate information.

In addition to a GPU, in some embodiments the second computer may also comprise a central processing unit (CPU), a memory, a storage device, and a network interface. The project manager may be configured to limit the work on the computing projects performed by the second computer to prevent the second computer from exceeding one or more of the following: a CPU utilization threshold, a GPU utilization threshold, a memory utilization threshold, a storage utilization threshold, and a network bandwidth utilization threshold.

The second computer may comprise one or more temperature sensors (e.g., for the computer's motherboard, CPUs, and GPUs), and the project manager may be configured to limit the work on the computing projects performed by the second computer to prevent the second computer from exceeding temperature thresholds for one or more of the following: the CPU, the GPU, and the motherboard. This may reduce annoying fan noise and increase the longevity of the second computer. The project manager may also be configured to limit the work based on user-specified times of day and days of week (e.g., to prevent fan noise during the times that the user may be in the same room as the second computer and want quite operation).

A method of communicating via a communication network is also contemplated. In one embodiment, the method may comprise downloading a project manager, sending a request for work from the project manager, and responding to the request for work by sending a computing project. The method may further comprise estimating an expected reward in a cryptocurrency for successfully completing the computing project; estimating an expected electricity cost in a fiat currency for completing the computing project on the second computer; determining an exchange rate for the cryptocurrency and the fiat currency to enable a comparison of the expected reward and the expected electricity cost; and executing the computing project on the second computer if the expected reward exceeds the expected electricity cost. Estimating the expected electricity cost may comprise obtaining a current utility rate from a web server or web service based on the geographic location of the second computer.

In some embodiments, the method may further comprise automatically converting received cryptocurrency rewards for successfully completing the computing project into fiat currency and or into video game tokens usable to purchase in-game items. The number of video game tokens may be boosted if the video game may be part of an incentive program.

A program stored on a non-transitory, computer-readable storage medium comprising instructions executable by a processor of a computational device is also contemplated. When executed, the program may be configured to cause the device to prompt a user to create an account and download a project manager module to the device. The project manager module may be configured to download and start execution of one or more work tasks and adjust priority of the work tasks if needed to prevent a significant negative impact on the device's responsiveness. The work tasks may comprise blockchain mining, machine learning, or distributed rendering. The project manager module may upload one or more results of the work tasks to the network, determine a reward amount for the results in a first cryptocurrency, and convert the reward amount into rewards into a video game currency.

The program may also comprise a game, and the project manager may be configured to estimate an expected reward in a cryptocurrency for successfully completing the computing project and estimate an expected electricity cost in a fiat currency for completing the computing project on the second computer. The program may also monitor the game and throttle the work tasks in response to the frame rate falling below a predetermined frame rate threshold or CPU's utilization rising above a predetermined CPU utilization threshold.

The computation device may further comprise a memory, wherein the project manager may be configured to monitor the memory's utilization and throttle the work tasks in response to the memory's utilization rising above a predetermined memory utilization threshold.

The project manager may be configured to monitor the network bandwidth's utilization and throttle the work tasks in response to the network bandwidth's utilization rising above a predetermined network bandwidth utilization threshold.

The computation device may comprise a CPU and GPU, and the project manager may be configured to monitor the CPU's and GPU's usage and temperatures and throttle the work tasks in response to either the CPU's or GPU's temperatures rising above predetermined CPU or GPU temperature or usage thresholds.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

In some embodiments, the contemplated system and method may provide a way for game developers to monetize non-paying players by subsidizing in-game content in return for credits earned through participation in activities like blockchain mining. Unlike a promotional content giveaway, this method may be used on a daily basis to keep players engaged with less of a risk of marginalizing paid content. Players may earn rewards based on the amount of successful progress made on the computing projects. Unlike prior systems, in some embodiments execution of the computing projects on the user's computer system may be intelligently controlled to avoid one or more of the following: (i) exceeding performance thresholds that can negatively impact the user and their computer, (ii) economic loss by performing work that costs more in utility cost than the value of the work performed, and (iii) excessive fan noise when it may annoy the user.

In some embodiments, progress on the computing projects may not only be made when the user's computer is sitting idle, but also when it is being used but under-utilized. In another embodiment, users may be given control via a user interface to specify when and at what level of resource usage progress may be made on the computing projects.

In some embodiments, rewards earned from the progress on the computing projects may be automatically converted from a cryptocurrency to a game currency (e.g., game credits or tokens) that users can exchange for items such as skins, in-game items, powerups, ad-skipping, or ad-free game time. The conversion may be based on current fiat currency exchange rates.

Figure 1:
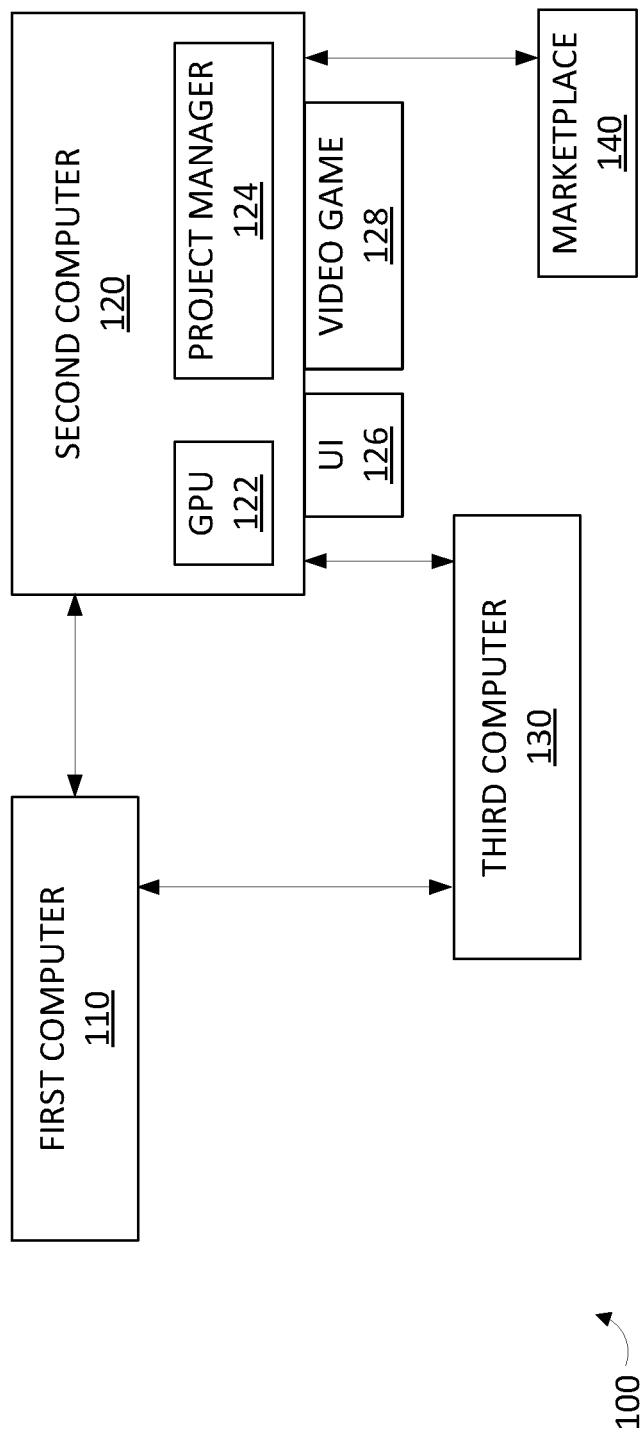
FIG. 1 is a schematic view generally illustrating an example of a communication network according to teachings of the present disclosure.

Turning now to FIG. 1, one embodiment of a communication network 100 is shown. Network 100 may include a first computer 110 and one or more second computers 120. First computer 110 may be a PC, server, or virtual machine, but other implementations are possible such as a dedicated hardware appliance. The second computer 120 may be a PC or laptop, but other types of devices are also possible and contemplated, e.g., a gaming console, appliance, mobile device such a tablet or phone, or a virtual machine.

The first computer 110 may be configured to monitor, control, direct, and/or assign one or more computing projects (or portions thereof) to the one or more second computers 120. The first computer 110 may be configured to manage/control work on a larger computing project, such as by distributing portions of the larger computing project as smaller computing projects to a plurality of second computers 120. In this embodiment, second computers 120 send results from the portion of the computing project that they complete to first computer 110, and first computer 110 works to minimize duplication in work performed by the plurality of second computers 120. First computer 110 may also be configured to track and convert rewards as described in more detail below.

The second computers 120 may include one or more of a variety of configurations. For example, and without limitation, a second computer may include a video game console, a gaming computer, a handheld mobile device, and/or any other type of device that may be used for gaming. The first computer 110 and the second computer 120 may be configured to communicate with each other via networks such as Ethernet and the internet.

In some embodiments, the second computer 120 may include one or more GPUs 122 configured to efficiently perform computationally intensive tasks in parallel (e.g. vector or single instruction multiple data SIMD operations) that are useful in performing computing projects that may be monetized. Examples of such computing projects may include calculating nonce and hash values for proof of work (PoW) based blockchain transactions. Other examples include, but are not limited to, machine learning and 3D rendering (e.g., ray tracing). Some of these computing projects may provide payment or rewards for participation and successful completion of compute work tasks. For example, in the blockchain-based Bitcoin cryptocurrency network, being the first to successfully calculate a nonce and hash combination (meeting the network's current difficulty requirements) for a block of transactions results in a reward of Bitcoin. This reward may then be converted into a second currency that is more applicable to the user, such as one or more in-game currencies or gaming marketplace currencies (e.g., Steam, Epic, etc.) that may be selected by a user, or into a fiat currency (e.g., United States dollars).

In some embodiments, a project manager application 124 may be downloaded (e.g., from first computer 110) and installed on the second computer 120 to manage the computing project's work tasks (e.g., mining, machine learning, or 3D rendering for external projects). The project manager 124 may, for example and without limitation, include code, that when executed by a processor of the second computer 120, may implement one or more tasks. The one or more tasks may include receiving computing assignments from a first computer 110, controlling work on the computing projects by the second computer 120, sending the results of the completed work to first computer 110, and/or receiving awards for completion of computing projects. In some embodiments, the project manager 124 may be configured to intelligently determine when to perform the computing projects and at what level of resource consumption to limit the computing projects.

In some embodiments, project manager 124 may be configured to monitor the status of second computer 120 in order to detect and take advantage of unused ("remnant") hardware cycles and resources and in order to start mining on a blockchain and maximize revenue given the hardware performance characteristics of second computer 120 and market conditions/transaction volumes on different blockchains.

Project manager 124 may also be configured to present a user interface (UI) 126 to the user. The UI 126 may include controls that permit the user to enter preferences or settings for power costs that may enable the project manager 124 to turn off work task execution (e.g., cryptocurrency mining) when revenue is lower than the cost of keeping the second computer executing those work tasks. The UI 126 may also include controls that permit the user to specific maximum thresholds for computer resource usage including CPU utilization percentage and temperature, GPU utilization percentage and temperature, motherboard temperature, and memory utilization. For example, if the second computer 120 has a noisy fan that turns on high when the CPU or GPU is above a certain temperature, it may be quite beneficial to the user to be able to specify a threshold temperature below that temperature. The UI 126 may also include controls that permit the user to specify times of day and days of week that the project manager 124 should not process work tasks on the second computer (e.g., to prevent fan noise when it would be particularly bothersome to the user).

In some embodiments, project manager 124 may be a stand-alone application, but in other embodiments project manager 124 may be bundled with, or be a part of, a video game 128. In embodiments where the project manager 124 is part of a video game 128, the project manager may be configured to monitor the frame rendering rate of the video game 128 when it is running and then throttle the computing projects usage of the second computer 120 resources to maintain a sufficient frame rate. This beneficially allows progress to be made on the computing project even when the video game 128 is being played but without negatively impacting game play. This frame rate monitoring may be performed independently or in connection with monitoring other resource utilization measures noted above such as CPU/GPU utilization and temperature.

If the second computer 120 completes a computing project or defined portion thereof, a user (e.g., an owner) associated with the second computer may earn a reward. The reward may initially be generated or provided in a first currency, such as a cryptocurrency (e.g., Bitcoin, Ether, Libra, etc.). The communication network or portion thereof (e.g., the first computer 110, the second computer 120, or the project manager 124) may be configured to automatically convert the reward from the first currency to a second currency. For example, and without limitation, the second currency may be a video game currency or marketplace currency selected by the user. The project manager 124 may be configured to receive a user selection of the second currency (e.g., which currency the first currency should be converted to) via the second computer's user interface 126.

In some embodiments, project manager 124 may be configured to auto-convert mining rewards/proceeds from a first cryptocurrency (e.g., bitcoin) into a predetermined video game currency. In other embodiments, the video game currency may one of a plurality of video game currencies (including video game platform currencies) selected by the user. In some embodiments, this may be done on a fixed conversion basis, but in other embodiments project manager 124 or first computer 110 may be configured to determine a current exchange rate from the first cryptocurrency to a second currency (e.g., a fiat currency like United States dollars) and use that exchange rate to determine how much video game currency to grant the user based on the mining rewards received.

In some embodiments, the project manager 124 may present the user with a list of options via UI 126 from which the user may select one or more games or gaming platforms (e.g., by providing their account credentials) as destinations for the reward conversion. Some options may include bonuses (also called "boosts") to the conversion that are provided by partners to entice users to convert their rewards into the partners' preferred game currency. For example, the project manager 124 may be configured to present the user with options via UI 126 or access to a marketplace 140 for selecting which video game currencies to convert or auto-convert rewards into. The conversion rate into one or more target video game currencies may have a boost provided via partnerships with major game publishers and gaming platforms. For example, some video game currencies may offer $1 of video game currency for a certain amount of completed computing work if auto-converted, while others might offer $1.2 or $1.3 for the same amount of completed computing work if auto-converted based on a boost provided by the publisher of the game or gaming platform.

In some embodiments, work on the computing project (work tasks) may be controlled via the project manager 124 and may include one or more potential components/aspects. For example, the project manager 124 may be configured to control the second computer 120 according to an expected or estimated net output of a computing project. The estimated net output of a computing project may correspond to a difference between an expected reward for work on or completion of the computing project and the costs for the work on or completion of the computing project.

The project manager 124 may also be configured to estimate costs of performing a computing project (or portion thereof) according to one or more factors. Such factors may include, for example and without limitation, an expected duration of the computing project, a voltage, and operating frequency of the processing units of the second computer that would be used to complete the computing project, a current of the processing units, a total power usage expected for the computing project, and/or a unit cost of power (e.g., $/kWh). The project manager may be configured to receive the unit cost of power from a user, such as via user interface 126. Additionally or alternatively, the project manager 124 may be configured to automatically communicate with a third computer 130 (e.g. a web server with utility rate information) to receive a current unit cost of power and/or a schedule of unit costs based on the geographic location of the second computer. The project manager 124 may also be configured to determine or estimate a reward for completing a computing project. For example, the project manager 124 may be configured to obtain a current value of a reward in the first currency and/or the second currency and operate the second computer such that the estimated net output is positive. Additionally or alternatively, if the project manager 124 determines that the second computer 120 cannot be operated such that the net output is positive, the project manager 124 may delay working on the computing project (e.g., until power unit costs are lower) and/or decline the computing assignment, which may include providing a notification to the first computer 110.

The project manager 124 may be configured to control work on a computing project such that the second computer 120 may operate at a plurality of power levels. For example, and without limitation, the project manager 124 may be configured to operate the second computer 120 at a user-selected power level, a processing unit lifespan-maximizing level, and/or an optimized/maximized power efficiency level. In some embodiments, the second computer 120 may be configured, via hardware and/or software, to enable support for using remnant cycles to mine on blockchains. Communication network 100 (or one or more computers therein) may be configured to auto-convert convert mining revenue into one of a selected set of in-game currency for the user or owner of the second computer 120 based on the current exchange rates from (i) the reward currency to a fiat currency exchange rate, and (ii) from a fiat currency to the selected set of in-game currencies. For example, if a game publisher has specified a boost of 15% for their video game currency "A" (VGCA) for purchases made with Euros, and a 10% boost for their video game currency "B" (VGCB) for purchases made with US dollars, and if both VGCA and VGCB were specified by the user as desirable target video game currencies, the project manager 124 or first computer 110 may be configured to auto-convert rewards received to VGCA via Euros to maximize utilization of boosts as boosts are often "good deals" for the end user.

In examples, the communication network 100 may be connected and/or associated with a subscription service, such as Twitch Prime. As noted above, in some circumstances, the automatic conversion of first currency into second currency may involve an increased/incentivized exchange rate for currencies associated with the service or games associated with the service.

In some embodiments, first computer 110, second computer 120 and third computer 130 may include an electronic controller and/or include an electronic processor, programmable microprocessor and/or microcontroller. In some embodiments, second computer 120 may include special hardware for performing computationally intensive operations, for example, an application specific integrated circuit (ASIC), a field-programmable gate array (FPGA), and/or one or more GPUs. Second computer 120 may include a CPU, a memory (e.g., a non-transitory computer-readable storage medium), and/or an input/output (I/O) interface. Computers 110, 120 and 130 may be configured to perform various functions, including those described in greater detail herein, with appropriate programming instructions and/or code embodied in software, hardware, and/or other medium and may be configured with a display.

Figure 2:
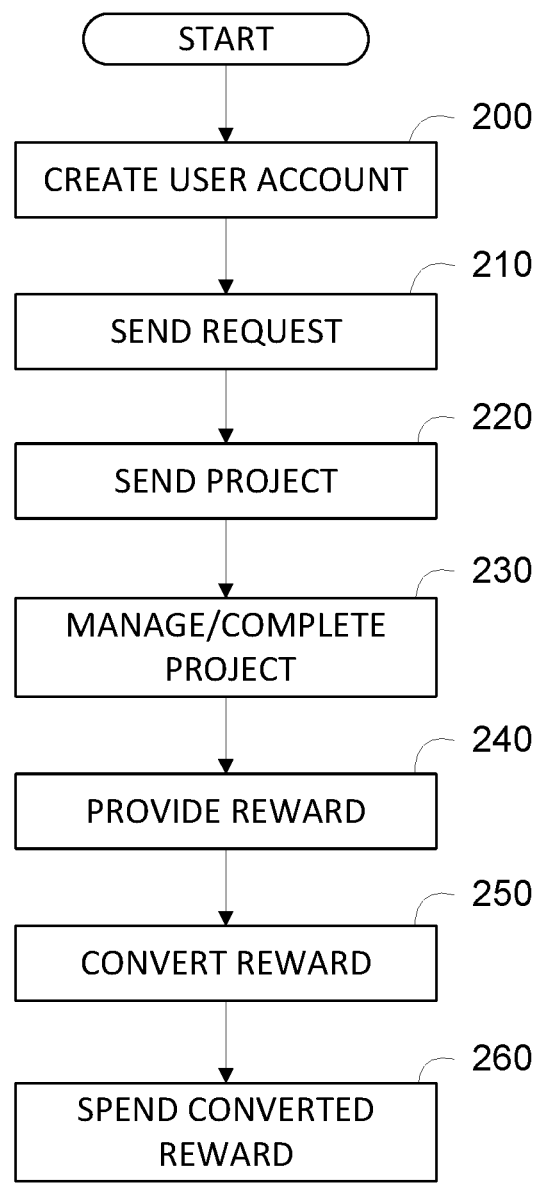
FIG. 2 is a flow diagram view generally illustrating an example of a method of communicating via a communication network according to teachings of the present disclosure.

Turning now to FIG. 2, one embodiment of a method for operating a communications network to monetize and reward users is shown. A user may create a user account (step 200) and/or download a project manager 124 to the second computer 120, such as from the first computer 110. The project manager 124 may contact (e.g., send a request to) the first computer for one or more computing projects (step 210), and the first computer may be configured to send one or more computing projects to the second computer (step 220). The project manager 124 may control work by the second computer on the one or more computing projects (step 230), which may include using extra or unused cycles of a processing unit (e.g., a GPU) of the second computer. As the second computer 120 completes computing projects, the user may earn rewards in a first currency (step 240) that may be automatically converted to a second currency (step 250) and applied to an account of the user (step 260). For example, as the second computer completes computing projects, the reward may automatically be deposited (as video game currency) into a video game currency account associated with the user. In some embodiments, a single video game currency may be used in connection with a plurality of video games. The user may then spend the converted reward in a video game or marketplace, such as to acquire one or more digital items or real-world items.

Figure 3:
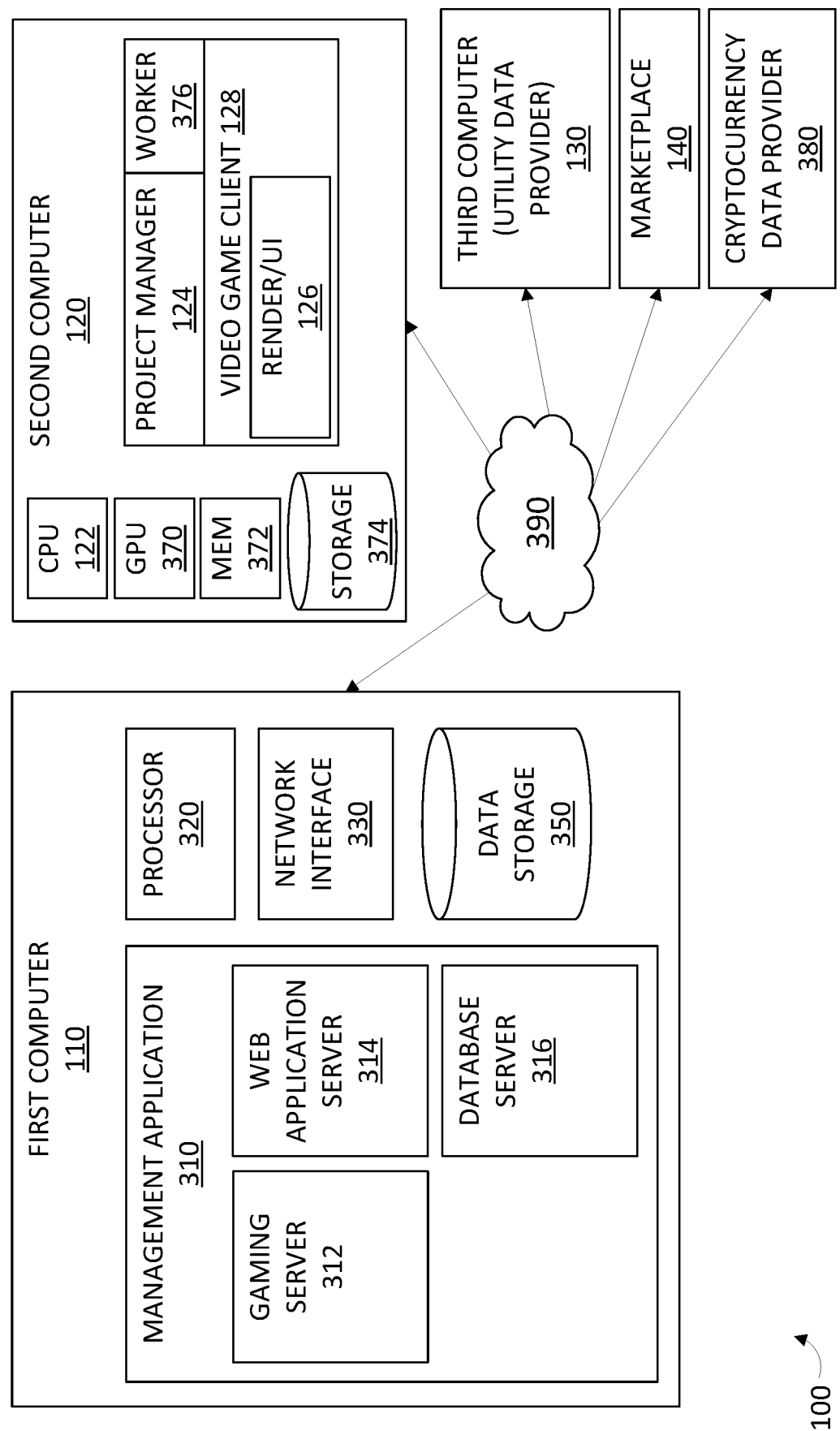
FIG. 3 is a schematic view generally illustrating another example of a communication network according to the teachings of the present disclosure.

Turning now to FIG. 3, another embodiment of a communications network 100 is shown. In this embodiment, first computer 110 comprises a processor 320, a network interface 330, and a data storage 350. Processor 320 may comprise a CPU and GPU combination, or other processor. Network interface 330 is configured to communicate with a network 390 (e.g., a local area network or wide area network such as the internet). Data storage 350 may comprise local hard drives (HDs), local solid-state drives (SSDs), network attached storage (NAS), virtual drives stored in volatile memory, or some combination thereof. First computer 110 is configured to execute a management application 310. In some embodiments, management application 310 may comprise a gaming server 312, a web application server 314, and a database server 316. In other embodiments, management application 310 may be configured to communicate with external gaming, web application, and database servers. Gaming server 312 may be configured serve and manage an online video game by interacting with video game client 128. Web application server 314 may be configured to integrate with the gaming servers and clients, and database server 316 may be configured to store and retrieve data associated with the online game (e.g., player information).

Management application 310 may configured to communicate with one or more second computers 120 via network interface 330 and network 390 and dispatch reward-producing work items (e.g., blockchain hashing tasks, 3D rendering tasks, machine learning tasks) to one or more second computers 120.

In one embodiment, second computer 120 may comprise a CPU 122, a GPU 370, a volatile memory 372, and a non-volatile storage 374. Second computer 120 may be configured to download and execute applications including a project manager 124, a worker 376, and a video game client 128. Video game client 128 may include a number of components, including a rendering and user interface (UI) component 126 that is configured to draw and update the graphical portions of the game. Project manager 124 may be configured to receive work tasks or projects from management application 310 and dispatch them for execution by worker process 376. Project manager 124 may also be configured to monitor video game client 128 and rendering/ UI component 126 to ensure that worker process 376 does not negatively impact the user experience of video game client 128 or second computer 120, for example by monitoring a frame rate for the video game.

Management application 310 and/or project manager application 124 may be configured to request and receive utility rate information from a third computer 130 (e.g., a web site or web service that provides utility rate information) based on the geographic location of second computer 120. Management application 310 and/or project manager application 124 may also be configured to access to a marketplace 140 for selecting which video game currencies to convert or auto-convert rewards into. A website or web service cryptocurrency data provider 380 may be used by management application 310 and/or project manager application 124 to determine current exchange rates when performing the video game currency conversions.

Figure 4:
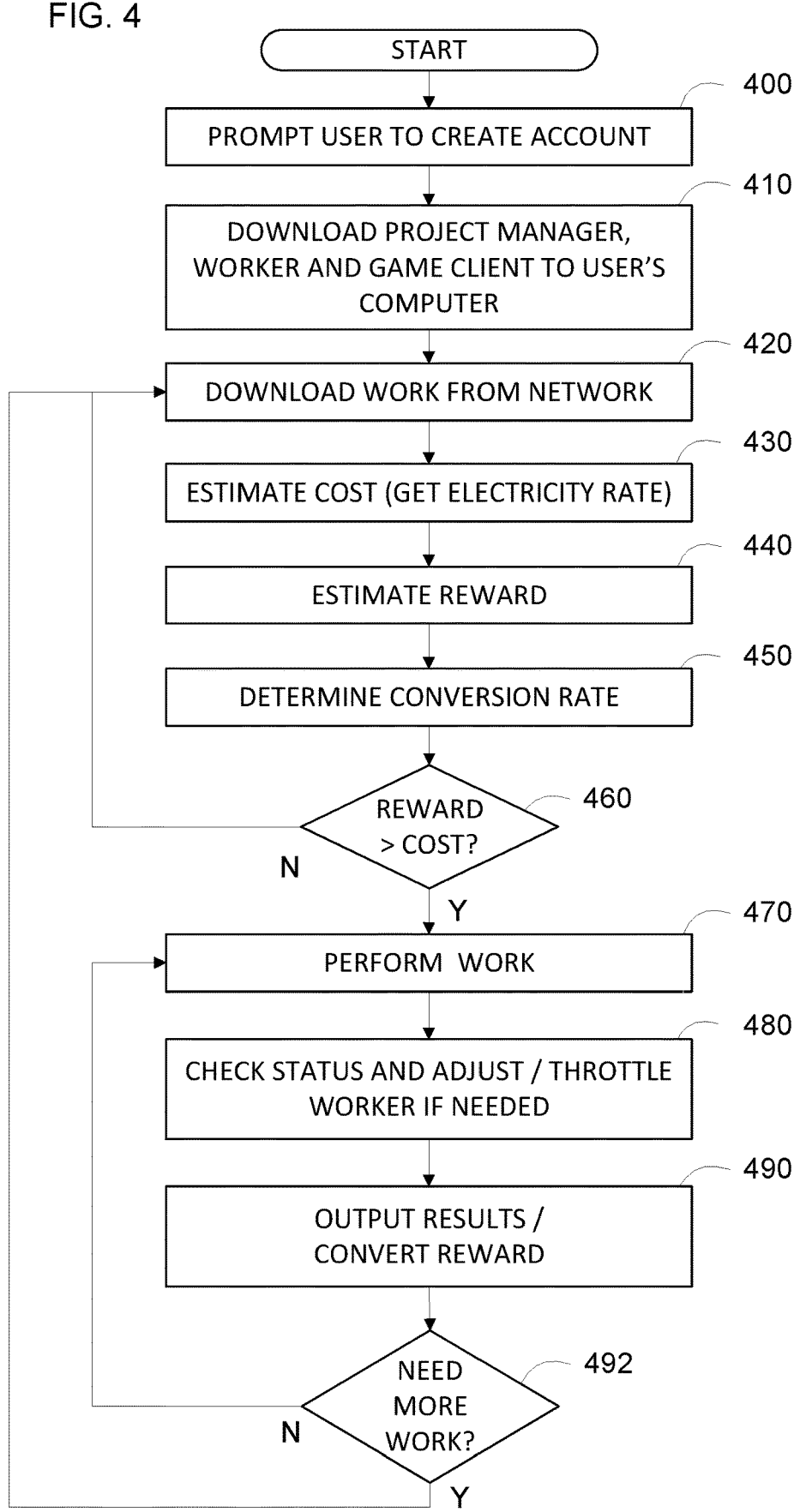
FIG. 4 is a flow diagram generally illustrating another embodiment of a method of communicating via a communication network according to the present disclosure.

Turning now to FIG. 4, another embodiment of a method for operating a communications network to monetize and reward users is shown. Initially, a user is prompted to create an account (step 400). An application including project manager, worker, and game client components may be downloaded to the user's computer (step 410). One or more compute-intensive work items that generate rewards when completed may be downloaded (step 420) to a work queue on the user's computer, e.g., by the project manager from a network source such as a cryptocurrency mining pool. The project manager may estimate a cost for performing the work on the user's computer by obtaining utility (electricity) rates for the location of the user (step 430). The cost may be estimated using for example the following data: (i) the user's computer's location (e.g., determined by using IP Geolocation lookup), (ii) a location-based online electricity database such as the OpenIE Utility Rate Database (URDB), and (iii) a measure or estimate of the user's computer's energy usage per unit of computation, e.g., based on the hardware configuration such as the computer's CPU and GPU combination. These data items may be automatically determined by the project manager, or the user may be prompted for one or more of the above data items in order to calculate the estimate.

The reward for completing the work item may be determined or estimated (step 440), e.g., by querying a first cryptocurrency network or mining pool. A conversion rate may be obtained (step 450) for converting the reward from a cryptocurrency to a fiat or other currency. For example, rewards for performing compute work tasks such as hashing calculations for blockchain networks may be provided in bitcoin, while utility rates may be specified in US dollars per kilowatt hour. The conversion rate may be determined for example by querying a web API provided by cryptocurrency exchange providers. If the estimated cost to perform the work is less than the expected or estimated value of the expected reward for successfully completing the work (step 460), the work task may be started (step 470). The expected reward may be determined based on a specified reward from a first cryptocurrency network and an exchange rate for the first cryptocurrency and a fiat currency. In some embodiments, if the estimated reward is greater than the estimated cost (step 460), the work task may not be performed.

While the computation work is being executed, the status of the user's computer may be monitored, and the amount of the computer's resources (e.g., CPU and GPU time, network bandwidth, memory or storage utilized) allocated to the work task may be modified, for example by throttling the threads performing the work task (step 480). Throttling may be accomplished by temporarily pausing one or more threads or processes executing the work tasks, or by reducing the CPU's or GPU's operating frequency or voltage. Once completed, the results of the work task (e.g., the hashes calculated, the 3D data that was rendered, or the machine learning data that was processed) may be output or sent back to the source of the work task, and any rewards received may be converted (step 490), e.g., to a video game currency. If the queue of work tasks runs low or the user's computer has additional processing resources available (step 492), additional work tasks may be downloaded (step 420).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A communication network, comprising:
   a first computer including a processor;
   a second computer configured for communication with the first computer, the second computer comprising a GPU and a project manager; and
   a non-transitory, computer-readable storage medium storing instructions executable by the processor of the first computer, which when executed by the processor of the first computer cause the first computer to prompt a user to login or create an account and to download the project manager to the second computer;
   wherein the project manager is configured to:
     receive computing projects from the first computer; and
     cause the GPU to work on the computing projects only when an estimated cost to perform the work is less than an estimated value of an expected reward for successfully completing the work;
   wherein the expected reward is determined based on a specified reward from a first cryptocurrency network and an exchange rate for the first cryptocurrency and a fiat currency; and
   wherein at least one of the first computer and the second computer are configured to convert the reward into a video game currency.

2. The communication network of claim 1, wherein the project manager is configured to calculate the cost to perform the work by multiplying the estimated power used and a power unit cost for the geographic location of the second computer as received from a third computer that is configured to provide utility rate information.

3. The communication network of claim 2, wherein the second computer further comprises a CPU, a memory, a storage device, and a network interface, wherein the project manager is configured to limit the work on the computing projects performed by the second computer to prevent the second computer from exceeding one or more of the following: a CPU utilization threshold, a GPU utilization threshold, a memory utilization threshold, a storage utilization threshold, and a network bandwidth utilization threshold to prevent negative impact on the second computer's responsiveness.

4. The communication network of claim 2, wherein the second computer further comprises a CPU, a motherboard, a CPU temperature sensor, and a GPU temperature sensor, wherein the project manager is configured to limit the work on the computing projects performed by the second computer to prevent the second computer from exceeding temperature thresholds for one or more of the following: the CPU, the GPU, and the motherboard to increase the longevity of the second computer and/or reduce fan noise.

5. The communication network of claim 3, wherein the project manager is configured to limit the work by the second computer based on user-specified times of day and days of week.

6. The communication network of claim 3, wherein the video game currency is automatically selected from a user-specified plurality of video game currencies to maximize utilization of currently available boosts.

7. A method of communicating via a communication network including a first computer and a second computer in communication with the first computer, the method comprising:
  operating a processor of the first computer to prompt a user to login or create an account;
  downloading, via the communication network, a project manager to the second computer from the first computer;
  sending a request for work from the project manager from the second computer to the first computer;
  responding to the request for work by sending a computing project from the first computer to the second computer;
  estimating an expected reward in a cryptocurrency for successfully completing the computing project;
  estimating an expected electricity cost in a fiat currency for completing the computing project on the second computer;
  determining an exchange rate for the cryptocurrency and the fiat currency to enable a comparison of the expected reward and the expected electricity cost;
  executing the computing project on the second computer if the expected reward exceeds the expected electricity cost; and
  automatically converting received cryptocurrency rewards for successfully completing the computing project into a video game currency.

8. The method of claim 7, wherein estimating the expected electricity cost comprises obtaining a current utility rate from a web server or web service based on the geographic location of the second computer.

9. The method of claim 7, wherein said automatically converting comprises automatically converting received cryptocurrency rewards into the video game currency via a fiat currency selected to optimize usage of boosts.

10. The method of claim 7, further comprising boosting the quantity of video game currency if the video game currency is part of an incentive program.

11. A non-transitory, computer-readable storage medium storing instructions executable by a processor of a computational device, which when executed cause the computational device to:
  prompt a user to login or create an account;
  download a project manager to a computation device of the user, wherein the project manager is configured to:
    (i) download work tasks from a network,
    (ii) start execution of the work tasks,
    (iii) adjust priority of the work tasks if needed to prevent negative impact on the computation device's responsiveness, and
    (iv) upload one or more results of the work tasks to the network;
  determine a reward amount for the results in a first cryptocurrency; and
  convert the reward amount into rewards into a video game currency.

12. The medium of claim 11, wherein the program further comprises a game, wherein the project manager is configured to:
  estimate an expected reward in a cryptocurrency for successfully completing the work tasks; and
  estimate an expected electricity cost in a fiat currency for completing the work tasks on the computation device.

13. The medium of claim 11, wherein the program further comprises a game, wherein the project manager is configured to:
  monitor a frame rate of the game, and
  throttle the work tasks in response to the frame rate falling below a predetermined frame rate threshold to maintain a sufficient frame rate for game play.

14. The medium of claim 11, wherein the computation device comprises a CPU, a GPU, a memory, and a network interface, and wherein, to prevent negative impact on the computation device's responsiveness, the project manager is configured to at least one of:
  monitor the CPU's utilization and throttle the work tasks in response to the CPU's utilization rising above a predetermined CPU utilization threshold,
  monitor the GPU's utilization and throttle the work tasks in response to the GPU's utilization rising above a predetermined GPU utilization threshold,
  monitor the memory's utilization, and throttle the work tasks in response to the memory's utilization rising above a predetermined memory utilization threshold, and
  monitor the network interface's bandwidth utilization and throttle the work tasks in response to the bandwidth utilization rising above a predetermined network bandwidth utilization threshold.

15. The medium of claim 11, wherein the project manager is configured to operate the computation device second at at least one of:
  a user-selected power level,
  a processing unit lifespan-maximizing level, and
  an optimized/maximized power efficiency level.

16. The medium of claim 11, wherein the project manager is configured to select the video game currency from a plurality of user-selected video game currencies to maximize boost usage.

17. The medium of claim 11, wherein the computation device comprises a CPU and GPU, and wherein the project manager is configured to:
  monitor the CPU's temperature and the GPU's temperature, and throttle the work tasks, to increase the longevity of the computation device and/or reduce fan noise, in response to either:

the CPU's temperature rising above a predetermined CPU temperature threshold, or the GPU's temperature rising above a predetermined GPU temperature threshold.

18. The medium of claim 11, wherein the work tasks are blockchain mining, machine learning, or distributed rendering.

19. The communication network of claim 1, wherein the project manager is configured to motor a status of the second computer, detect remnant cycles and/or unused resources, and cause the GPU to utilize the detected remnant cycles and/or unused resources to work on the computing projects.

20. The communication network of claim 1, wherein:

the second computer includes:
- a worker process configured to execute the computing projects, and
- a video game client including a rendering and user interface component configured to draw and update graphical portions of a video game, the project manager is configured to:
- dispatch the computing projects to the worker process,
- monitor the video game client and/or a frame rate of the video game, and
- throttle the work on the computing projects performed by the worker process to prevent the worker process from negatively impacting the video game client and/or game play.

* * * * *